United States Patent [19]

Rem et al.

[11] Patent Number: 5,555,642
[45] Date of Patent: Sep. 17, 1996

[54] PROCESS FOR UPGRADING LOW-QUALITY WOOD

[75] Inventors: Peter C. Rem; Hans van der Poel; Herman P. Ruyter, all of Amsterdam, Netherlands

[73] Assignee: Shell Oil Company, Houston, Tex.

[21] Appl. No.: 179,012

[22] Filed: Jan. 7, 1994

[30] Foreign Application Priority Data

Jan. 8, 1993 [EP] European Pat. Off. ............. 93200045

[51] Int. Cl.$^6$ ........................................ F26B 7/00
[52] U.S. Cl. ................... 34/423; 34/68; 34/246
[58] Field of Search ................. 34/389, 60, 423, 34/68, 418, 246

[56] References Cited

U.S. PATENT DOCUMENTS

| | | |
|---|---|---|
| 2,495,282 | 1/1950 | Pinkney . |
| 2,642,371 | 6/1953 | Fahrni . |
| 3,021,244 | 2/1962 | Meiler . |
| 3,282,313 | 11/1966 | Schuerch . |
| 4,007,312 | 2/1977 | Stofko et al. . |
| 4,061,819 | 12/1977 | Barnes . |
| 4,163,840 | 8/1979 | Geyer et al. . |
| 4,255,477 | 3/1981 | Holman . |
| 4,469,156 | 9/1984 | Norimoto et al. ......................... 34/13.8 |
| 4,500,594 | 2/1985 | Credali et al. . |
| 4,569,873 | 2/1986 | Robbins . |
| 4,610,913 | 9/1986 | Barnes . |
| 4,751,131 | 6/1988 | Barnes . |
| 4,942,081 | 7/1990 | Reiniger . |
| 5,017,319 | 5/1991 | Shen . |

FOREIGN PATENT DOCUMENTS

| | | |
|---|---|---|
| 058541 | 8/1982 | European Pat. Off. . |
| 373725 | 6/1990 | European Pat. Off. . |
| 373726 | 6/1990 | European Pat. Off. . |
| 460235A1 | 12/1991 | European Pat. Off. . |
| 03097503 | 4/1991 | Japan . |
| 497477 | 12/1938 | United Kingdom . |

OTHER PUBLICATIONS

Markku Peraeniitty & Kauko Kotikangas of Imatran Voima Oy, Finland "Industrial Radio Frequency Drying of Wood", a Kema Conference Paper.
R. Stirling, "Ohmic Heating—A New Process for the Food Industry", Power Engr. Journal, Nov. 1987, pp. 365–371.
C. H. Biss et al, "Process Engineering in the Food Industry", Ed. Elsevier, Amsterdam, 1989, pp. 17–27.

*Primary Examiner*—Henry A. Bennett
*Assistant Examiner*—Susanne C. Tinker

[57] ABSTRACT

A process for upgrading low-quality wood to high-quality wood comprising the following stages:
 a) softening the wood by directly heating it electrically in the presence of a softening agent at a pressure of at least the equilibrium vapor pressure of the softening agent at the operating temperature;
 b) drying the softened wood;
 c) curing the dried wood; and
 d) cooling the cured wood.

15 Claims, 1 Drawing Sheet

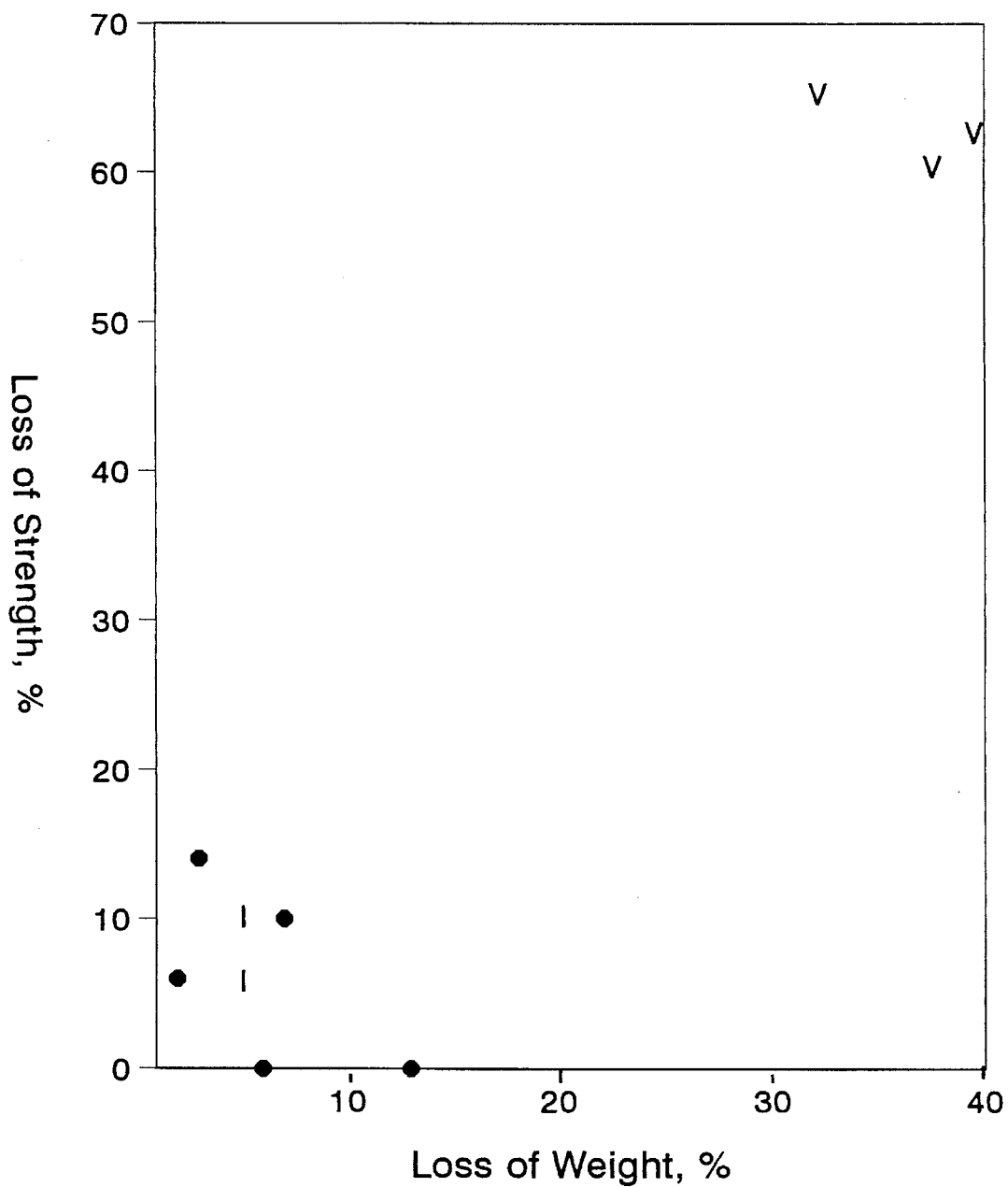
FIG. I

PROCESS FOR UPGRADING LOW-QUALITY WOOD

FIELD OF THE INVENTION

The present invention relates to a process for upgrading low-quality wood to high-quality wood in an environmentally sound way. The present invention further relates to a high-quality-product obtained by such process.

DESCRIPTION OF THE PRIOR ART

According to EP Application 0373726 a cellulosic fibrous aggregate is formed from a cellulosic fibrous material by a process which comprises: a softening stage comprising exposing a section of cellulosic fibrous material to the action of an aqueous softening agent at a temperature in the range of from about 150° C. to about 220° C. at a pressure of at least the equilibrium vapor pressure of the softening agent at the operating temperature, thereby at least partially disproportionating and hydrolysing the hemicellulose and lignin present in the cellulosic fibrous material; and a curing stage comprising drying the product of the softening stage at a temperature in the range of from about 100° C. to about 220° C. to yield a cross-linked cellulosic matrix.

This process uses traditional ways of heating and drying the wood. These methods rely on thermal conduction to raise the temperature of the wood and evaporate water contained therein. The poor thermal conductivity of wood and the sensitivity of the process chemistry to extended heating times result in limitations on product thickness and quality for such a process. Furthermore, it has been found that gradients in temperature, pressure and moisture concentration induce stresses in wood, which may result in the formation of cracks and consequent loss of mechanical strength. Finally, long heating times lead to low throughput and thus to an unattractive process economy. It has now been found that these problems can be avoided by employing alternative processing techniques based on electric or dielectric heating.

SUMMARY OF THE INVENTION

The present invention relates to a process for upgrading low-quality wood to high-quality wood comprising the following stages:
a) softening the wood by directly heating it electrically in the presence of an aqueous medium at a pressure of at least the equilibrium vapor pressure of the aqueous medium at the operating temperature;
b) drying the softened wood;
c) curing the dried wood; and
d) cooling the cured wood.

DESCRIPTION OF THE FIGURES

FIG. 1 depicts a graph of the data obtained in the Example. The graph shows the loss of strength plotted on the vertical axis against the loss of weight on the horizontal axis for various treated and non-treated samples.

DESCRIPTION OF THE PREFERRED EMBODIMENTS

The starting material utilized in the process of the present invention is wood of a relatively low-quality, preferably freshly harvested material in which the loss of moisture has been prevented. If the selected starting material has been dried, its moisture content is preferably increased by exposure to water or steam. A starting material having a moisture content of from about 67% wt to 150% wt (calculated on dry basis) is especially preferred. The starting material are preferably trunks or boards of wood, i.e. elongated sections of wood. The minimum length is preferably 25 cm, more preferably at least 50 cm, still more preferably at least 1 m. Usually wood sections of at least 1.5 m will be used, up to 4 m, and even 6 meters long. The starting material usually will have a width and thickness of at least 2×2 cm, preferably 3×3 cm, more preferably 4×4 cm. Preferably, the length of the different pieces of starting material are the same or almost the same. The starting material may have a square or rectangular diameter, but also a circular, hemicircular or even irregular diameter is possible.

Although the present process can be applied to high density wood, in which case, a significant improvement in the water resistant properties of the wood results, the process offers even more advantage when applied to light wood, often obtained from trees with a high growth rate. In this case, a considerable improvement in the mechanical properties and water resistance of the wood results. Examples of species of trees yielding such wood include spruce, poplar, willow, beech, pine and eucalyptus.

The wood is softened in the presence of an aqueous medium at an elevated temperature. In this softening stage the hemicellulose and lignin in the wood are transformed to components of lower molecular weight. The upper limit of the temperature is the temperature at which the cellulosic fibrous material of the wood thermally degrades. In general temperatures in the range of from about 140° C. to about 240° C. may be employed, the duration of the softening stage being in the range of from about 1 minute to about 2 hours.

The aqueous medium is suitably water.

The operating temperature is preferably in the range of from about 160° C. to about 220° C., more preferably from about 180° C. to about 200° C., and the duration of the softening stage is preferably in the range of from about 2 minutes to about 1 hour, more preferably from about 2 minutes to about 20 minutes.

The duration of the softening stage will vary according to the precise conditions under which softening is effected In this respect it has been experienced that excessively long residence times at temperatures in the range of from about 120° C. to about 160° C. can promote harmful side reactions in the material which can lead to a reduction in the quality of the end product. The starting material should preferably be heated to the operating temperature of the softening stage in as short a time as possible. Moreover, it is preferred that the duration of the softening stage is as short as possible. This can be achieved by very simple electric technique called ohmic heating in which the wood is treated as an electrical resistance, and by applying an electric current through the material in order to generate heat therein. This enables the wood to be brought up to the desired process conditions in a homogeneous and efficient manner, usually in ten minutes or less. Therefore the softening stage is preferably carried out by means of ohmic heating.

The heating phase of the process, when applying ohmic heating, is upscalable to any conceivable product size.

Advantageously, the ohmic heating procedure can also be applied for at least a part of the subsequent drying stage, preferably in the first part thereof.

Furthermore, the temperature can be raised to the desired level without inducing any thermal or mechanical stress in the wood whatsoever by heating the wood electrically. A plant based on ohmic heating can in principle be very simple, essentially consisting of an autoclave and a source of electricity. Within the autoclave sections of wood, advantageously freshly harvested wood, can be heated to the desired softening temperature by passing an electric current, preferably an alternating current, through the wood, which has been placed between at least two electrodes. Preferably, the sections are placed between the electrodes with the wood grain transverse to the direction of the current. After having been softened the wood is dried, preferably at the softening temperature, and finally cured. In the simplest of plants the low quality wood enters the autoclave freshly cut and leaves the autoclave as a high-quality product that only needs to be cooled before it can be worked.

The softening can be conducted by ensuring an intimate and direct contact between the sections of wood and the electrodes as well as between the sections. This is especially applicable to sections of the same size and shape, and, preferably, having an oblong cross-section. More conveniently said softening of the sections of wood can be conducted by submerging the sections in an aqueous medium of suitable electric conductivity, in which medium the electrodes have also been placed. In this context the term "suitable electric conductivity" refers to a degree of conductivity which, throughout the softening stage, is very similar to that of sections being softened. After having been softened the wood is dried, preferably at the softening temperature, and finally cured. In the simplest of plants the low quality wood enters the autoclave freshly cut and leaves the autoclave as a high-quality product that only needs to be cooled before it can be worked.

During the ohmic heating the applied voltage over the wood beams is preferably in the range of from about 10 to about 200, more preferably about 80 to about 120 Volt per cm distance between the electrodes, the breaking down voltage of wood being about 200 V/cm. The alternating current which is preferably applied during the ohmic heating, can be of any frequency, but advantageously this current has a frequency of about 50 or about 60 Hz as such current is supplied on public distribution systems. For a better understanding of the ohmic heating technique reference is made to two articles in the technical literature: a) "Ohmic heating—a new process for the food industry" by R. Stirling, in "Power Engineering Journal", Nov. 1987, pp. 365–371. b) "The development and application of Ohmic heating for the continuous heating of particulate foodstuffs", by C. H. Biss et al., in "Process engineering in the food industry", ed. Elsevier, Amsterdam, 1989, pp. 17–27.

As mentioned hereinbefore not only the softening stage but also part of the drying stage of the present process can be carried out by means of ohmic heating. It is preferred that during this part of the drying stage water is removed from the wood via evaporation down to a moisture content of about 50% (calculated on a dry basis). The drying stage can be completed dielectrically i.e. by means of radio-frequency (RF) heating or heating with the aid of microwaves. It is also evisaged that the whole drying stage of the present process can be conducted via dielectric means. Furthermore, at least part of said drying can also be effected with the aid of conventional evaporative methods as well as with a combination thereof with a dielectric method. Typically, when the softening stage is carried out by ohmic heating, the drying is carried out at a temperature in the range of from about 100° C. to about 220° C. at a pressure in the range of from about 1 bar to about 20 bar. At the end of the drying stage the water content is preferably in the range of from 0 to about 15% wt, calculated on a dry basis. In RF-heating the current frequency is in the range of from about 10 kHz to about 300 MHz, about 27 MHz being preferred. In microwave heating the frequency is in the range of from about 300 MHz to about 10 GHz.

According to a further preferred embodiment of the invention both the softening stage and the drying stage are carried out by dielectric heating, advantageously by radio-frequency (RF) heating wherein the applied frequency is in the rang of from about 10 kHz to about 300 MHz and the applied amplitude is preferably in the range of from about 2500 V/m to about 20000 V/m. It will be appreciated that, when applying dielectric heating in the softening stage, the actual heating will have to precede via a direct and intimate contact between the sections of wood and the electrodes, and hence that the sections will require an oblong cross-section as described hereinbefore.

After the dielectric softening stage, the hot wood is dried, preferably using the same RF-power source as in the softening stage, by drawing off vapor at a constant pressure, advantageously in the range of from about 1 bar to about 20 bar. The temperature of the wood in the drying stage is preferably in the range of from about 90° C. to about 200° C., more preferably in the range of from about 100° C. to about 160° C.

During a second part of the drying stage as described hereinbefore, an external mechanical pressure may optionally be applied to the hot softened wood in order to compress it to a smaller volume, thus making it less porous and permeable. Advantageously this pressure is in the range of from about 0.1 bar to about 10 bar and the reduction in volume of the wood is in the range of from about 10% to about 70%. When applying mechanical pressure to the dried sections during the second part of any drying stage, it is preferred that the moisture content of the dried wood is in the range of from about 0 to about 5% wt, calculated on dry material.

Suitable means for exerting mechanical pressure on the softened and dried sections, include, for example, compressing with the aid of a platen press or in a mold.

After the drying stage, the softened, dried and possibly compressed wood is cured.

The curing stage is suitably conducted at a constant temperature in the range of from about 100° C. to about 240° C., preferably from about 160° C. to about 220° C., and a pressure in the range of from about 1 bar to about 20 bar, for a time in the range of from about 20 minutes to about 90 minutes.

After the curing stage the wood is cooled. This can be done in any suitable manner.

The wood, after having been treated by the process according to the invention, has properties as regards strength and durability under unfavorable circumstances which are similar to those of tropical hard wood as will be shown in the following Example which is provided for illustrative purposes only and not to be construed as limiting the invention.

The ranges and limitations provided in the instant specification and claims are those which are believed to particularly point out and distinctly claim the instant invention. It is, however, understood that other ranges and limitations that perform substantially the same function in substantially the same way to obtain the same or substantially the same result are intended to be within the scope of the instant invention as defined by the instant specification and claims.

EXAMPLE 1

Sections of freshly harvested poplar (200×15×2 cm$^3$) were treated according to the invention in a closed autoclave following the procedure wherein the sections were in direct and intimate contact with the electrodes as in the absence of an external aqueous phase. The softening stage was carried out by ohmic heating at a temperature of 195° C., a period of time of 10 minutes and applying an initial voltage of 110 V/cm.

The drying stage was carried out by microwave heating at a temperature of 110° C., a period of time of 20 minutes, at atmospheric pressure. The frequency of the dielectric field was 2.4 GHz.

In the curing stage the hot sections were placed in a hot press during 60 minutes at a temperature of 195° C. and an impressed pressure of 6 bar.

The planks were then cooled to ambient temperature by leaving them in the open air.

The treated samples had a density of 700 kg/m$^3$, a Shore D hardness of 40, while a weight loss of 25% had occurred during said treatment.

Samples having dimensions of 12×1×0.5 cm$^3$ were cut from the treated planks.

These samples were subjected to an outdoor durability test. The samples were suspended such that half of their length was submerged in water, the other half being in the air above the water. This durability test was continued from September 1990 up to and including February 1992.

After the test the samples were dried and their loss of strength and their loss of weight was measured.

For the determination of the loss of strength the modulus of elasticity E of the samples before and after the outdoor durability test were measured, respectively, according to International Standard ISO 178–1975 (E).

$$\text{Loss of strength} = \frac{E_1 - E_2}{E_1} \times 100\%$$

$E_1$=modulus of elasticity of the sample before the test, in megapascals $E_2$=modulus of elasticity of the sample after the test, in megapascals $$\text{Loss of weight} = \frac{W_1 - W_2}{W_1} \times 100\%$$

$W_1$=weight of the sample before the test in grams, calculated on dry mass.

$W_2$=weight of the sample after the test in grams, calculated on dry mass.

In Figure I the loss of strength is plotted on the vertical axis against the loss of weight on the horizontal axis. The black dots represent the values for the poplar samples, treated in accordance with the invention.

The Roman numerals I give the position of non-treated tropical hardwood samples of teak and azobe, which have been tested in the same way as the treated poplar samples.

The Roman numerals V show the deterioration of non-treated poplar samples, also tested in the same manner as the treated ones.

From Figure I it is clearly apparent that by means of the process according to the invention the quality of low-value poplar wood can be improved up to the values of high-value tropical hardwood.

EXAMPLE 2

A 6×6×10 cm$^3$ sample of freshly cut poplar was submerged in water in a closed 1 liter autoclave, which was equipped with two electrodes. The contents of the autoclave were heated to 195° C. and maintained at said temperature for 5 minutes by applying an initial voltage of 100 v/cm between the electrodes. Subsequently the liquid phase was removed from the autoclave, which was followed by a controlled and gradual depressurizing of the autoclave to atmospheric conditions, in the course of which the moisture present in the sample was partially evaporated, and the temperature dropped to 100° C.

Further drying of the sample was conducted in a conventional microwave oven at 110° C. during 25 minutes, using in frequency of 2.4 GHz. This resulted in a reduction of the moisture content from 150% wt to 11 % wt calculated on solids.

Finally, the sample was used by heating it between two hot plates during 60 minutes at 195° C. without applying pressure which was followed by cooling the sample to 90° C. by cooling the plates. Further cooling to ambient temperature was conducted in the open air.

The treated sample had a density of 510 kg/m$^3$ and a Shore D hardness of 45. While a weight loss of 20.3% wt had occurred during said treatment.

What is claimed is:

1. A process for upgrading low-quality wood to high-quality wood comprising the following stages:
    a. softening the low-quality wood by directly heating it electrically in the presence of an aqueous medium at a pressure of at least the equilibrium vapor pressure of the aqueous medium;
    b. drying the softened wood, wherein the drying stage comprises a first part and a second part;
    c. curing the dried wood; and
    d. cooling the cured wood, wherein the softening stage and at least the first part of the drying stage are carried out by ohmic heating.

2. The process of claim 1 wherein the aqueous medium is water and the softening is carried out at a temperature in the range of from about 160° C. to about 220° C. for a period of time from about 1 minute to about 2 hours.

3. The process of claim 1 wherein the second part of the drying stage is completed dielectrically.

4. The process of claim 1 wherein during the second part of the drying stage, an external mechanical pressure in the range of from about 0.1 bar to about 10 bars is applied.

5. The process of claim 1 wherein the ohmic heating is carried out at an applied voltage in the range of from about 10 V/cm to about 200 V/cm.

6. The process of claim 5 wherein the drying is carried out at a temperature in the range of from about 100° C. to about 220° C. and a pressure in the range of from about 1 bar to about 20 bar.

7. The process of claim 5 wherein the curing is carried out at a temperature in the range of from about 160° C. to about 220° C., a pressure in the range of from about 1 bar to about 20 bar and during a period of time in the range of from about 20 to about 90 minutes.

8. A process for upgrading low-quality wood to high-quality wood comprising the following stages:
    a. softening the low quality wood by directly heating it dielectrically to a temperature in the range of from about 160° C. to about 220° C. for a period of time from about 1 minute to about 2 hours in the presence of an aqueous medium comprising water at a pressure of at least the equilibrium vapor pressure of the aqueous medium at the operating temperature;
    b. drying the softened wood in a first part and a second part by heating it dielectrically;

c. curing the dried wood; and d. cooling the cured wood.

9. The process of claim 8 wherein a frequency is applied in the range of from about 10 kHz to about 300 MHz, and wherein an amplitude is applied in the range of from about 2500 V/m to about 20000 V/m.

10. The process of claim 9 wherein the drying is carried out at a temperature in the range of from about 90° C. to about 200° C. and a pressure in the range of from about 1 bar to about 20 bar.

11. The process of claim 9 wherein the curing is carried out at a temperature in the range of from about 160° C. to about 220° C., a pressure in the range of from about 1 bar to about 20 bar and during a period of time in the range of from about 20 to about 90 minutes.

12. The process of claim 11 wherein during the second part of the drying stage, an external mechanical pressure in the range of from about 0.1 bar to about 10 bars is applied.

13. A process for upgrading low-quality wood to high-quality wood comprising the following steps:

a. softening the low-quality wood by directly heating said wood by ohmic heating at an applied voltage in the range of from about 10 V/cm to about 200 V/cm in the presence of water at a pressure of at least the equilibrium vapor pressure of water at the operating temperature of from about 160° C. to about 220° C. for a period of time from about 1 minutes to about 2 hours;

b. drying the softened wood wherein said drying is carried out in a first part and a second part, said drying in said first part comprising ohmic heating the wood at a temperature in the range of from about 100° C. to about 220° C. and a pressure in the range of from about 1 bar to about 20 bar and said drying in said second part comprising dielectric heating while applying an external mechanical pressure in the range of from about 0.1 bar to about 10 bar to said wood;

c. curing the dried wood at a temperature in the range of from about 160° C. to about 200° C., a pressure in the range of from about 1 bar to about 20 bar and during a period of time in the range of from about 20 minutes to about 90 minutes; and d. cooling the cured wood.

14. A process for upgrading low-quality wood to high-quality wood comprising the following steps:

a. softening the low-quality wood by directly heating said wood by dielectric heating in the presence of water at a pressure of at least the equilibrium vapor pressure of water at the operating temperature of from about 160° C. to about 220° C. for a period of time from about 1 minutes to about 2 hours;

b. drying the softened wood at a temperature range of from about 90° C. to about 200° C. and a pressure in the range of from about 1 bar to about 20 bar;

c. curing the dried wood at a temperature in the range of from about 160° C. to about 200° C., a pressure in the range of from about 1 bar to about 20 bar and during a period of time in the range of from about 20 minutes to about 90 minutes; and d. cooling the cured wood.

15. A process for upgrading low-quality wood to high-quality wood comprising the following stages:

a. softening the low quality wood by directly heating it dielectrically to a temperature in the range of from about 160° C. to about 220° C. for a period of time from about 1 minute to about 2 hours in the presence of an aqueous medium comprising water at a pressure of at least the equilibrium vapor pressure of the aqueous medium at the operating temperature;

b. drying the softened wood by heating it dielectrically;

c. curing the dried wood; and d. cooling the cured wood.

* * * * *